United States Patent
Vals et al.

(10) Patent No.: US 9,027,027 B2
(45) Date of Patent: May 5, 2015

(54) THREAD MANAGEMENT BASED ON DEVICE POWER STATE

(75) Inventors: Angelo Renato Vals, Redmond, WA (US); Chetley T. Laughlin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1575 days.

(21) Appl. No.: 12/135,213

(22) Filed: Jun. 9, 2008

(65) Prior Publication Data

US 2009/0307696 A1 Dec. 10, 2009

(51) Int. Cl.
G06F 9/46 (2006.01)
G06F 9/48 (2006.01)

(52) U.S. Cl.
CPC ............ G06F 9/4893 (2013.01); Y02B 60/144 (2013.01)

(58) Field of Classification Search
CPC combination set(s) only.
See application file for complete search history.

(56) References Cited

U.S. PATENT DOCUMENTS

| | | | |
|---|---|---|---|
| 5,881,055 A | 3/1999 | Kondo | |
| 6,781,911 B2 | 8/2004 | Riesenman et al. | |
| 6,915,221 B2 * | 7/2005 | Pehrsson et al. | 702/63 |
| 7,111,182 B2 | 9/2006 | Gary | |
| 7,234,139 B1 * | 6/2007 | Feinberg | 718/1 |
| 7,245,936 B2 | 7/2007 | Bahl et al. | |
| 7,454,631 B1 * | 11/2008 | Laudon et al. | 713/300 |
| 7,526,661 B2 * | 4/2009 | Nakajima et al. | 713/320 |
| 7,788,668 B2 * | 8/2010 | Barker | 718/103 |
| 8,028,179 B2 * | 9/2011 | Zettler | 713/320 |
| 2002/0049920 A1 | 4/2002 | Staiger | |
| 2003/0086381 A1 | 5/2003 | Terry et al. | |
| 2003/0149904 A1 | 8/2003 | Kim | |
| 2005/0141554 A1 | 6/2005 | Hammarlund et al. | |
| 2007/0004374 A1 | 1/2007 | Kneckt | |
| 2007/0192641 A1 * | 8/2007 | Nagendra et al. | 713/320 |
| 2007/0240159 A1 | 10/2007 | Sugiyama | |
| 2009/0063845 A1 * | 3/2009 | Lin | 713/100 |

OTHER PUBLICATIONS

"Wi-Fi Alliance WMM Power Save Certification Brings Robust Power Management to Handheld Wi-Fi Devices", Copyright 2007, wi-fi.org/pressroom_overview.php?newsid=19.
Adams, et al. "Power Save Adaptation Algorithm for Multimedia Streaming to Mobile Devices", IEEE International Conference on Portable Information Devices, 2007, PORTABLE07, May 25-29, 2007, pp. 1-5.

(Continued)

*Primary Examiner* — Eric C Wai
(74) *Attorney, Agent, or Firm* — John Jardine; Kate Drakos; Micky Minhas

(57) ABSTRACT

Managing threads for executing on a computing device based on a power state of the computing device. A power priority value corresponding to each of the threads is compared to a threshold value associated with the power state. The threads having an assigned power priority value that violates the threshold value are suspended from executing, while the remaining threads are scheduled for execution. When the power state of the computing device changes, the threads are re-evaluated for suspension or execution. In an embodiment, the threads on a mobile computing device are managed to maintain the processor in a low power state to reduce power consumption.

20 Claims, 11 Drawing Sheets

(56) References Cited

OTHER PUBLICATIONS

Mohapatra, et al. "Integrated Power Management for Video Streaming to Mobile Handheld Devices", Proceedings of the eleventh ACM international conference on Multimedia, 2003, ACM Press New York, NY, USA, pp. 582-591.

Roodyn, "Mobile PC Power Management", Dated: Jun. 2005, ://msdn2.microsoft.com/en-us/library/ms812491.aspx.

* cited by examiner

US 9,027,027 B2

THREAD MANAGEMENT BASED ON DEVICE POWER STATE

BACKGROUND

Traditional power management methods modify a power state of a processor based on a system load, an estimated trend in processor usage, or other heuristic to achieve better performance. For example, the clock speed of the processor may be increased to handle an increase in the system load. On a mobile computing device, the processor typically executes infinite loops for animation, background services, or implementing parallelism. To allow these processes to execute continuously, the traditional power management methods limit, or entirely prevent, the processor from entering an idle state or other low power state even when the device is in standby mode (e.g., the display is off). Thus, the processes rapidly drain the battery while providing little value to a user of the mobile device.

SUMMARY

Embodiments of the invention control thread or process execution to manage a power state of a computing device. In some embodiments, a scheduler filters access to a processor in the computing device based on a power priority value assigned to each thread. A threshold value for the computing device changes as the power state of the computing device changes. The scheduler analyzes the power priority value of each thread relative to the threshold value to determine whether to suspend the thread. Execution of the suspended threads may resume upon another change in the power state of the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
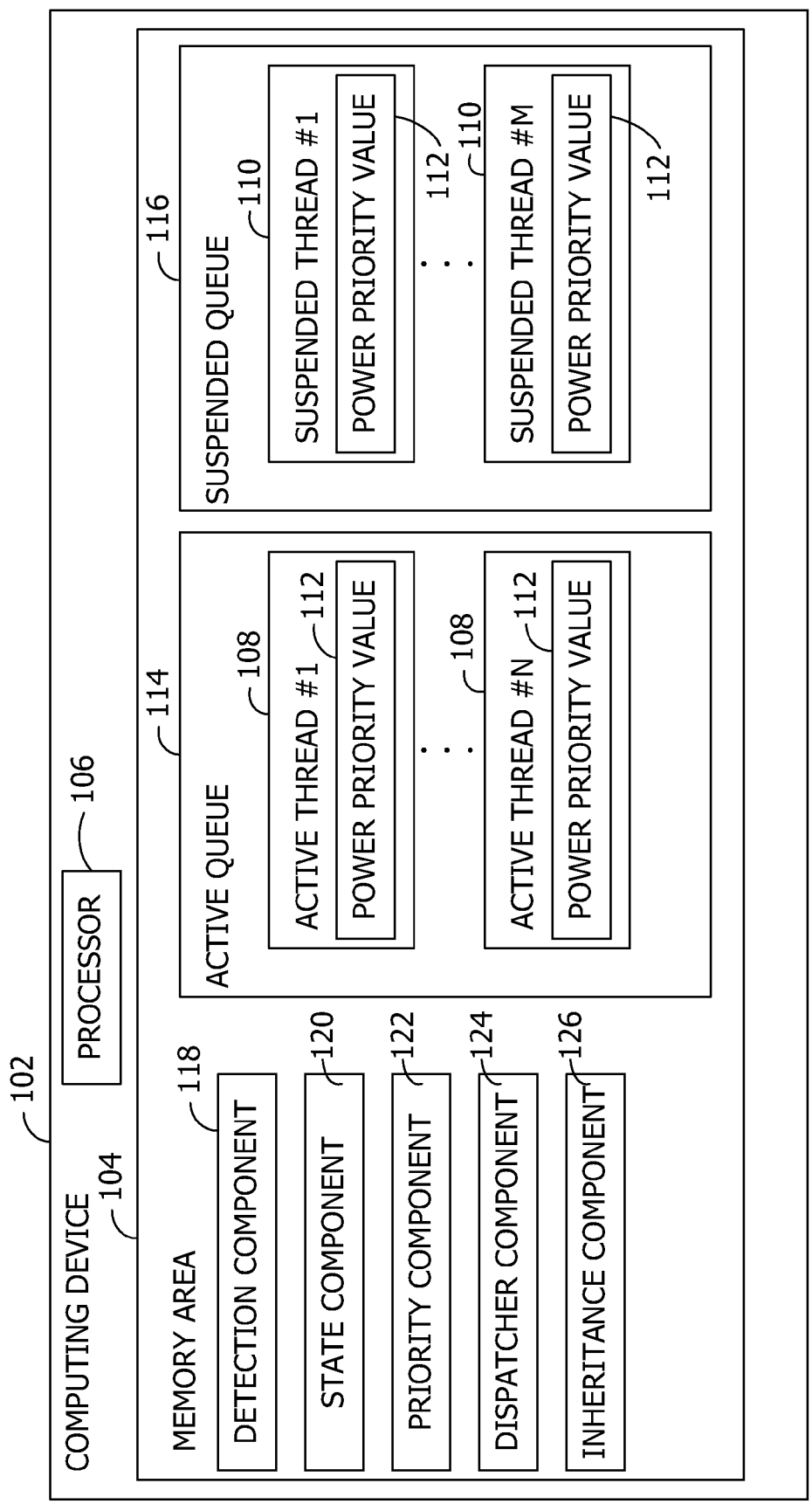
FIG. 1 is an exemplary block diagram illustrating a computing device managing a list of active threads and a list of suspended threads.

Embodiment of the invention manage a load on a computing device 102 such as shown in FIG. 1 based on a power state of the computing device 102. For example, the load is limited to maintain the computing device 102 in a low power state by restricting execution of threads. In some embodiments, a power priority value 112 or other indicator of priority is assigned to each of the threads. The threads are filtered by comparing each power priority value 112 to a threshold value associated with the power state of the computing device 102. Those threads with power priority values 112 violating the threshold value are suspended from execution, while the other threads are allowed to execute. In this way, threads with a higher priority are allowed to execute.

While the power priority value 112 is described in some embodiments as being separate and distinct from a process priority value traditionally used for managing the power state of a processor 106 such as shown in FIG. 1, other embodiments are operable with using the process priority as the power priority value 112 to manage the threads based on the power state.

While some embodiments of the invention are illustrated and described herein with reference to a mobile computing device 402 (e.g., see FIG. 4) or other power constrained device such as a telephone, a personal digital assistant, or a gaming console, aspects of the invention are operable with any device that performs the functionality illustrated and described herein, or its equivalent. For example, embodiments of the invention are operable with a desktop computing device, a laptop computer, and other computing devices to reduce the power draw of the device thereby reducing infrastructure power costs, among other benefits. Further, aspects of the invention are operable with any system including systems that idle the processor 106 by placing the processor 106 into a halt state when no threads are being executed (e.g., hibernate and suspend are system states).

Referring again to FIG. 1, an exemplary block diagram illustrates the computing device 102 managing threads. The computing device 102 includes a memory area 104 and at least one processor 106. The memory area 104, or other computer-readable medium, stores a list of active threads 108 such as active thread #1 through active thread #N, where N is a positive integer value. The memory area 104 further stores a list of suspended threads 110 such as suspended thread #1 through suspended thread #M, where M is a positive integer value. Each of the active threads 108 and the suspended threads 110 has a power priority value 112. The power priority values 112 are assigned to each of the active threads 108 and the suspended threads 110 by, for example, an application program developer or by a user of the computing device 102. In the embodiment of FIG. 1 as illustrated, the list of active threads 108 is stored in an active queue 114 and the list of suspended threads 110 is stored in a suspended queue 116.

In an embodiment, the processor 106 is transformed into a special purpose microprocessor by executing computer-executable instructions or by otherwise being programmed. For example, the memory area 104 stores computer-executable components for scheduling threads based on the power state of the computing device 102. Exemplary components include a detection component 118, a state component 120, a priority component 122, a dispatcher component 124, and an inheritance component 126. The detection component 118 receives a request for execution of a thread (e.g., at thread creation) and determines the power priority value 112 associated with the thread. For example, the detection component 118 determines the power priority value 112 by querying a database via an application programming interface (API).

The state component 120 determines a power state of the computing device 102 and a corresponding threshold value. For example, the state component 120 accesses a lookup table or other mapping between power state and threshold value. Alternatively or in addition, the power state corresponds to a power state associated with the processor 106. The state component 120 determines the power state, for example, upon detection or notification of a change in the power state (e.g., when the computing device 102 becomes idle). Exemplary power states include, but are not limited to, one or more of the following: ON, IDLE, and BACKLIGHT OFF. In another embodiment, the power states correspond to a battery power level and/or state. For example, the power states include, but are not limited to, one or more of the following: RECHARGING, 100%, 75%, 50%, 25%, and LOW.

The priority component 122 compares the power priority value 112 determined by the detection component 118 with the threshold value determined by the state component 120. The dispatcher component 124 alters the contents of the active queue 114 and the suspended queue 116 based on the comparison performed by the priority component 122. For example, the dispatcher component 124 schedules the thread for execution if the power priority value 112 determined by the detection component 118 violates the threshold value determined by the state component 120. Otherwise, the dispatcher component 124 suspends execution of the thread. In an embodiment, the dispatcher component 124 schedules the thread for execution if the power priority value 112 exceeds the threshold value.

In some embodiments, the dispatcher component 124 schedules the thread for execution by moving the thread from the suspended queue 116 to the list of active threads 108 in the active thread queue. Alternatively, if the thread is already in the active queue 114, the dispatcher component 124 maintains the thread in the active queue 114.

In an example, two threads are being executed by the processor 106: one thread in the foreground (e.g., a high priority electronic mail application) and one thread in the background (e.g., a low priority synchronization application). When the power state of the computing device 102 changes to standby mode (e.g., display turns off), the synchronization application will continue to run while the electronic mail application will be suspended.

The inheritance component 126 increases the power priority value 112 of the thread above the threshold value if the thread is blocking a resource required by another thread being executed (or to be executed). This allows the thread to execute until completion which releases the resource required by the other thread. The operation of the inheritance component 126 is further described and illustrated with reference to FIGS. 8-11 below.

In an embodiment, the processor 106 and computer-executable components operate as part an operating system scheduler for managing the threads. Alternatively, aspects of the invention may be implemented outside the operating system scheduler as, for example, a power priority monitoring service. The power priority monitoring service monitors and alters the threads in the active queue 114 and in the suspended queue 116.

Figure 2:
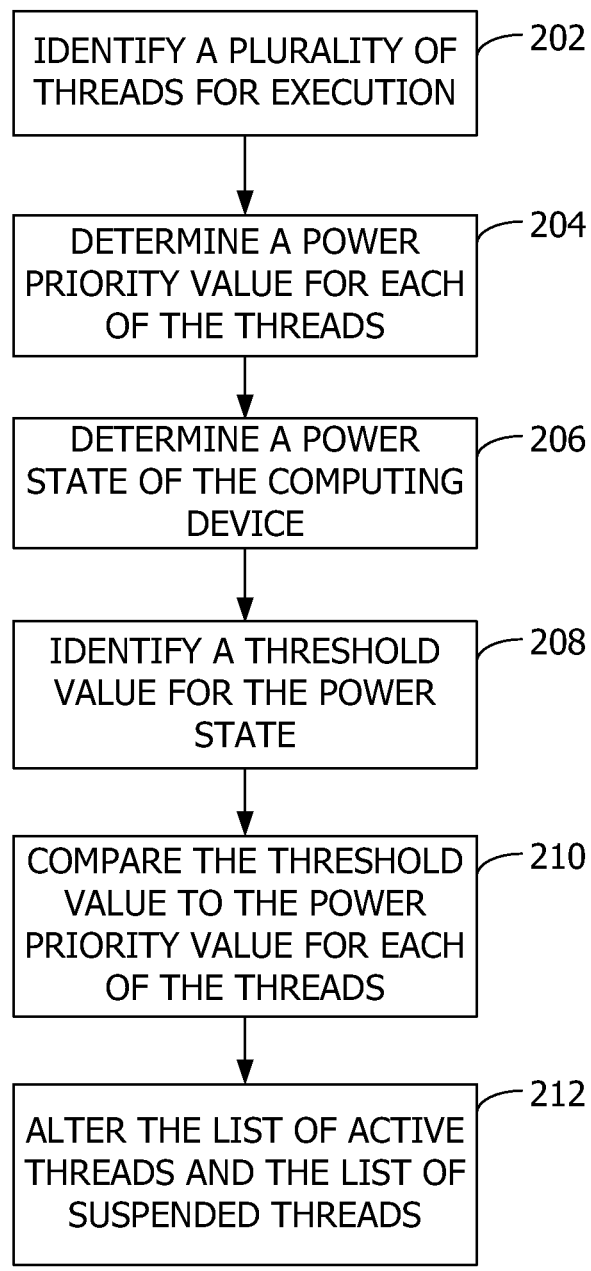
FIG. 2 is an exemplary flow chart illustrating operation of a scheduler managing threads based on a power priority value for each of the threads.

Referring next to FIG. 2, an exemplary flow chart illustrates operation of a scheduler identifying and managing threads. In an embodiment, an operating system scheduler performs the operations illustrated in the flow charts, including FIG. 2. Aspects of the invention, however, are operable with any logic embodied in hardware or software that provides the illustrated functionality. For example, the logic may be performed by a web service or special purpose hardware.

Figure 3:
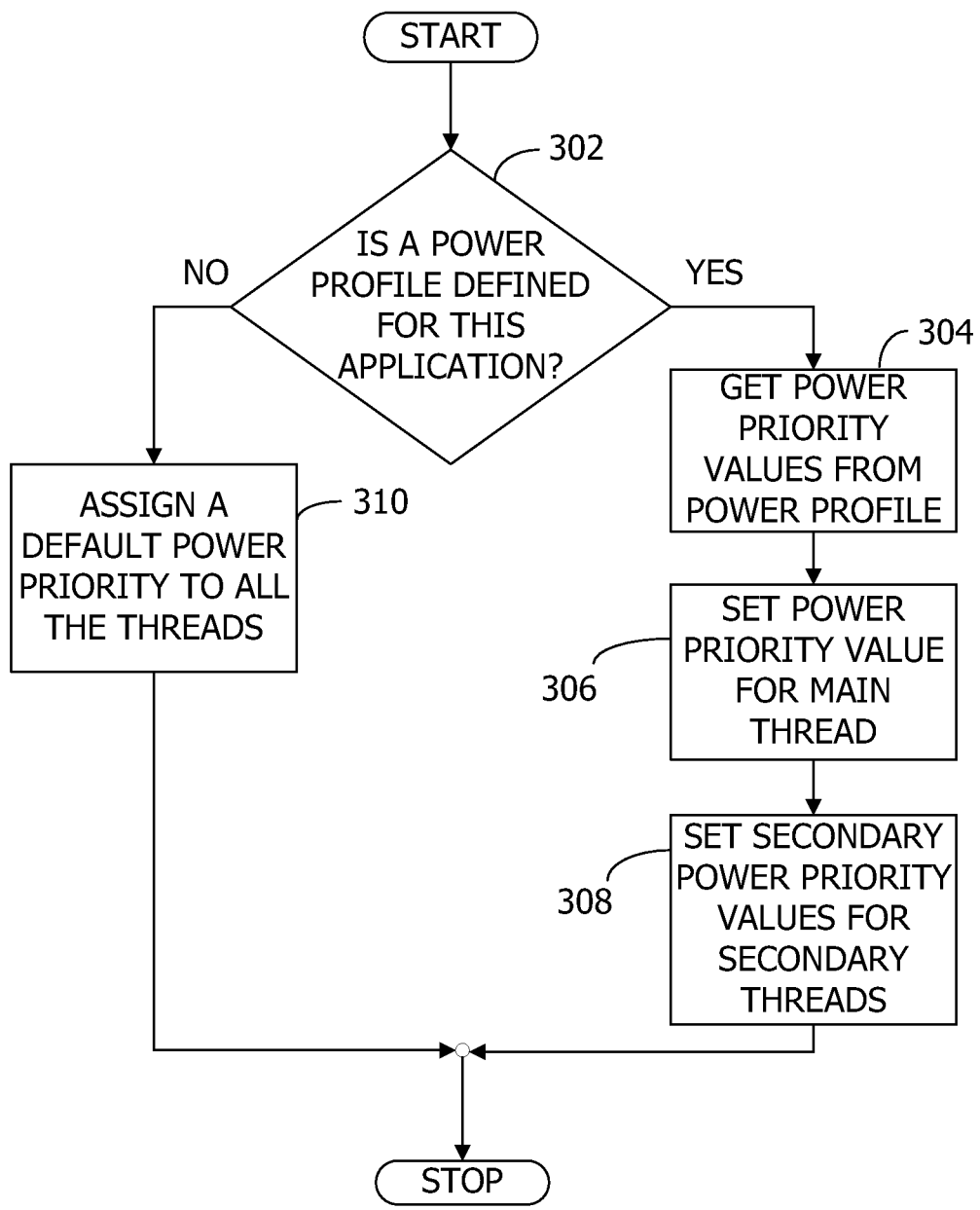
FIG. 3 is an exemplary flow chart illustrating the assignment of power priority values for threads based on a power profile.

At 202, a plurality of the threads for execution is identified. At 204, the power priority value 112 is determined for each of the identified threads. In an embodiment, the scheduler assigns the power priority value 112 based on factors such as a recommendation from the application developer (e.g., a power profile as illustrated in FIG. 3), rules or guidelines established by an original equipment manufacturer of the computing device 102 or the processor 106, or the like. In the absence of any provided basis for assigning the power priority value 112 for each of the threads, a default power priority value is assigned to each of the threads. For example, the default power priority value is a value that prevents the threads from running in any power state other than ACTIVE.

At 206, the current power state of the computing device 102 or processor 106 is determined. In another example, element 206 occurs when the power state of the computing device 102 or processor 106 changes. A threshold value corresponding to the power state is identified at 208. For example, the relationship between the threshold value and the power state is defined in a lookup table or other data structure. At 210, the threshold value is compared to the power priority value 112 for each of the threads. The list of active threads 108 and the list of suspended threads 110 are altered at 212 as a function of the comparison. In general, one or more of the threads are selected based on the comparison, and the execution status of the selected threads is adjusted. For example, if the power state changes to a more restrictive state (e.g., from ACTIVE to IDLE), the threads with a power priority value 112 less than the threshold value are selected and moved from the list of active threads 108 to the list of suspended threads 110 (e.g., for suspension). In another example, if the power state changes to a less restrictive state (e.g., from IDLE to ACTIVE), the threads with a power priority value 112 greater than or equal to the threshold value are selected and moved from the list of suspended threads 110 to the list of active threads 108 (e.g., for execution). Aspects of the invention are not limited to the specific examples described herein. That is, aspects of the invention are operable with any form of comparison between the threshold value and the power priority value 112 for each of the threads.

Referring next to FIG. 3, an exemplary flow chart illustrates the assignment of power priority values 112 for threads based on a power profile or other configuration information for an application program. If the power profile exists at 302, the scheduler determines the power priority value 112 for each of the threads in the application program based on the power profile at 304. In the example of FIG. 3, the power priority value for the main thread is set at 306, and the power priority values for the secondary threads are set at 308. Alternatively or in addition, the power profile defines a single power priority value for all the threads associated with the application program. If the power profile does not exist at 302, a default power priority is assigned to all the threads at 310.

Figure 4:
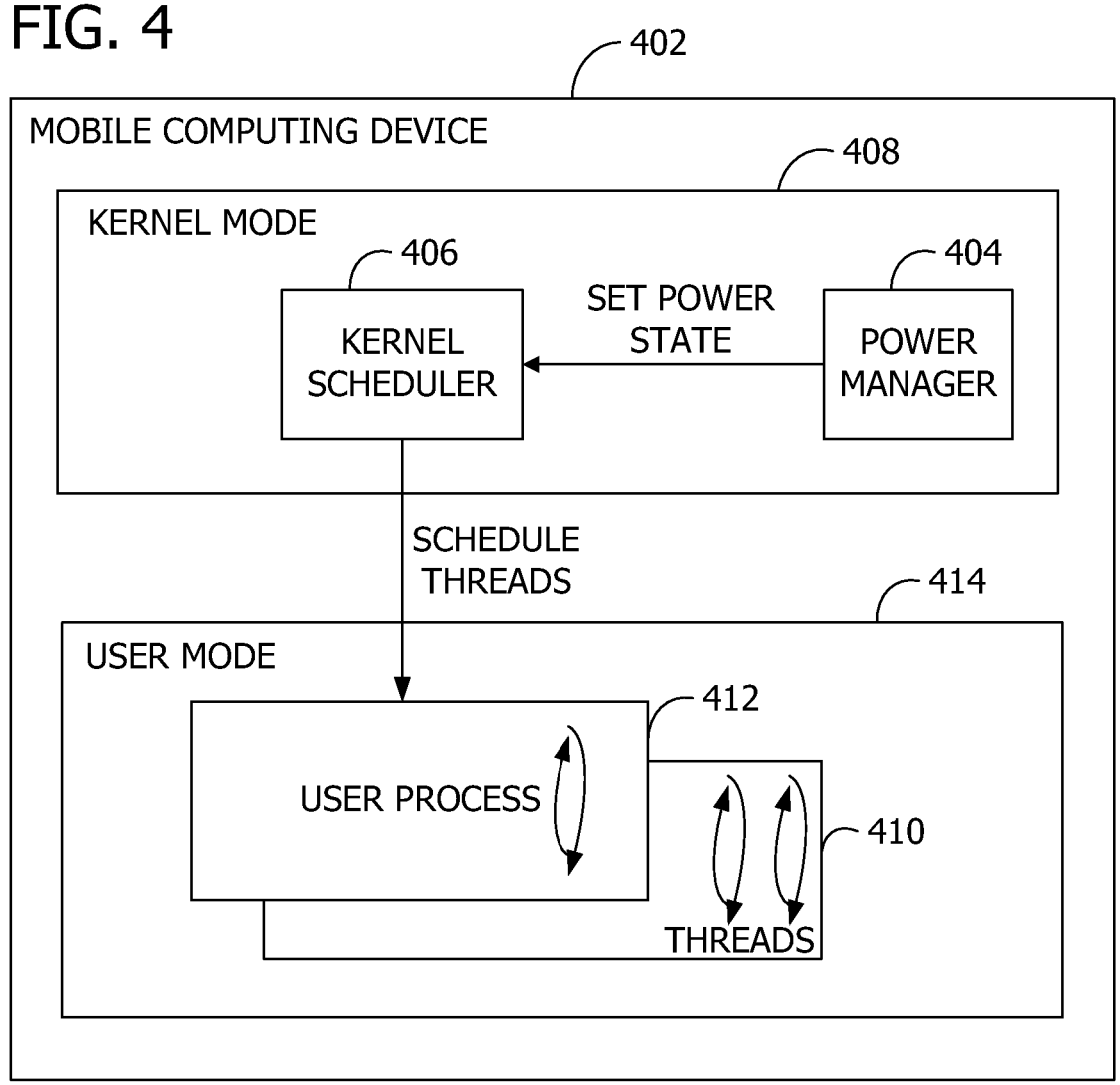
FIG. 4 is an exemplary block diagram illustrating a scheduler managing user-mode threads.

Referring next to FIG. 4, an exemplary block diagram illustrates a kernel scheduler 406 managing user-mode threads 410 on the mobile computing device 402. In the example of FIG. 4, a power manager 404 detects changes in the power state of the mobile computing device 402 and communicates the power state information to the kernel scheduler 406. Both the power manager 404 and the kernel scheduler 406 operate in kernel mode 408. The kernel scheduler 406 schedules the threads 410 associated with a user process 412 executing in user mode 414 on the mobile computing device 402.

Figure 5:
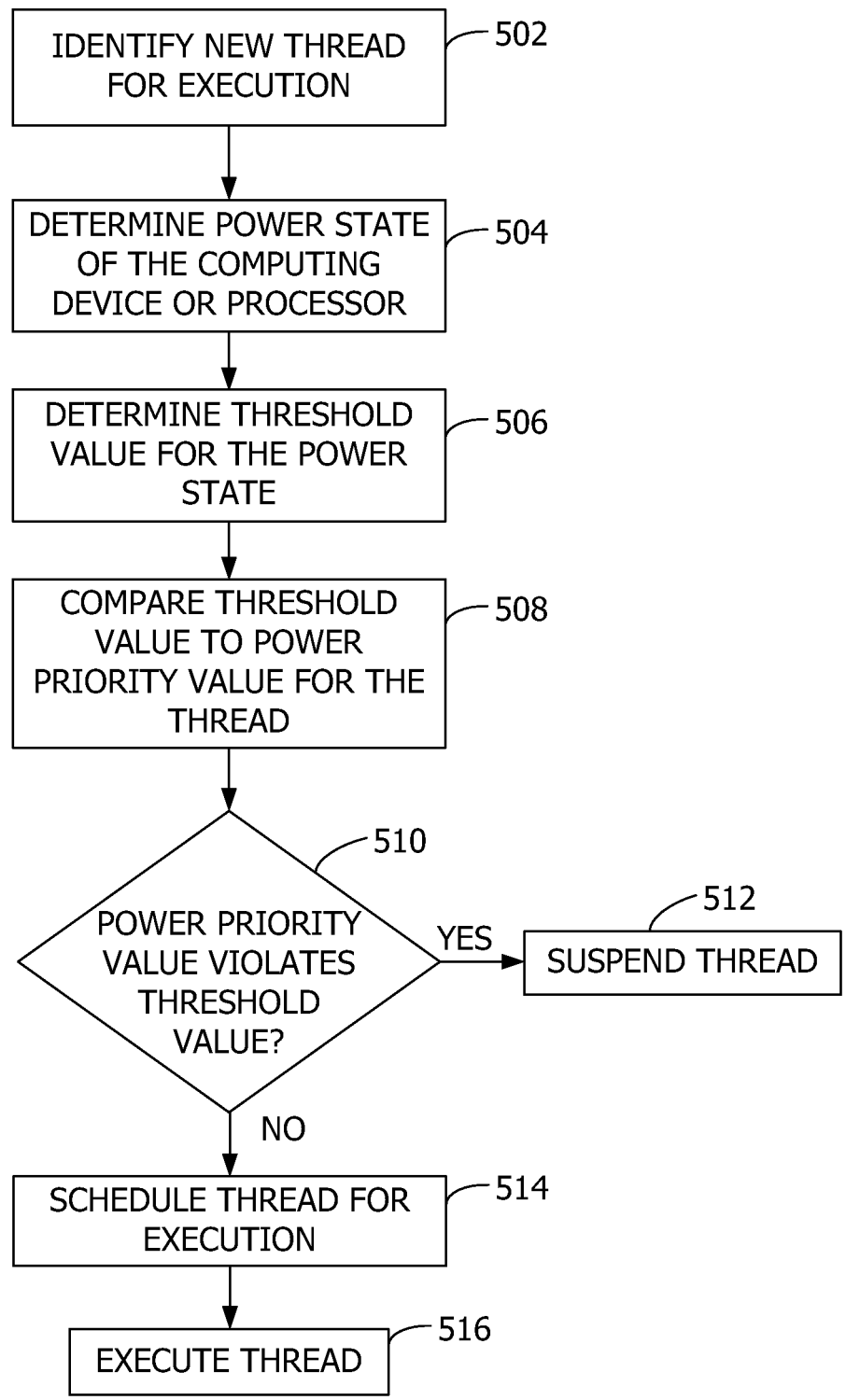
FIG. 5 is an exemplary flow chart illustrating the scheduling or suspension of a thread based on the power priority value.

Referring next to FIG. 5, an exemplary flow chart illustrates the scheduling or suspension of a thread based on the power priority value 112 upon thread creation. At 502, an operating system scheduler, or other component, identifies a new thread for execution. An application program, for example, spawns, forks, or otherwise creates the new thread. The operating system scheduler detects creation of the thread, and determines the power state of the computing device 102 at 504. The operating system scheduler determines the threshold value associated with the determined power state at 506. In an embodiment, the operating system scheduler defines a plurality of power states for the computing device 102 and defines the power state value or other threshold value for each of the defined plurality of power states.

The determined threshold value is compared to the power priority value 112 for the new thread at 508. If the power priority value 112 violates the threshold value at 510, the new thread is suspended from executing at 512. If the power priority value 112 does not violate the threshold value at 510, the new thread is scheduled for execution at 514. The thread then executes at 516.

Figure 6:
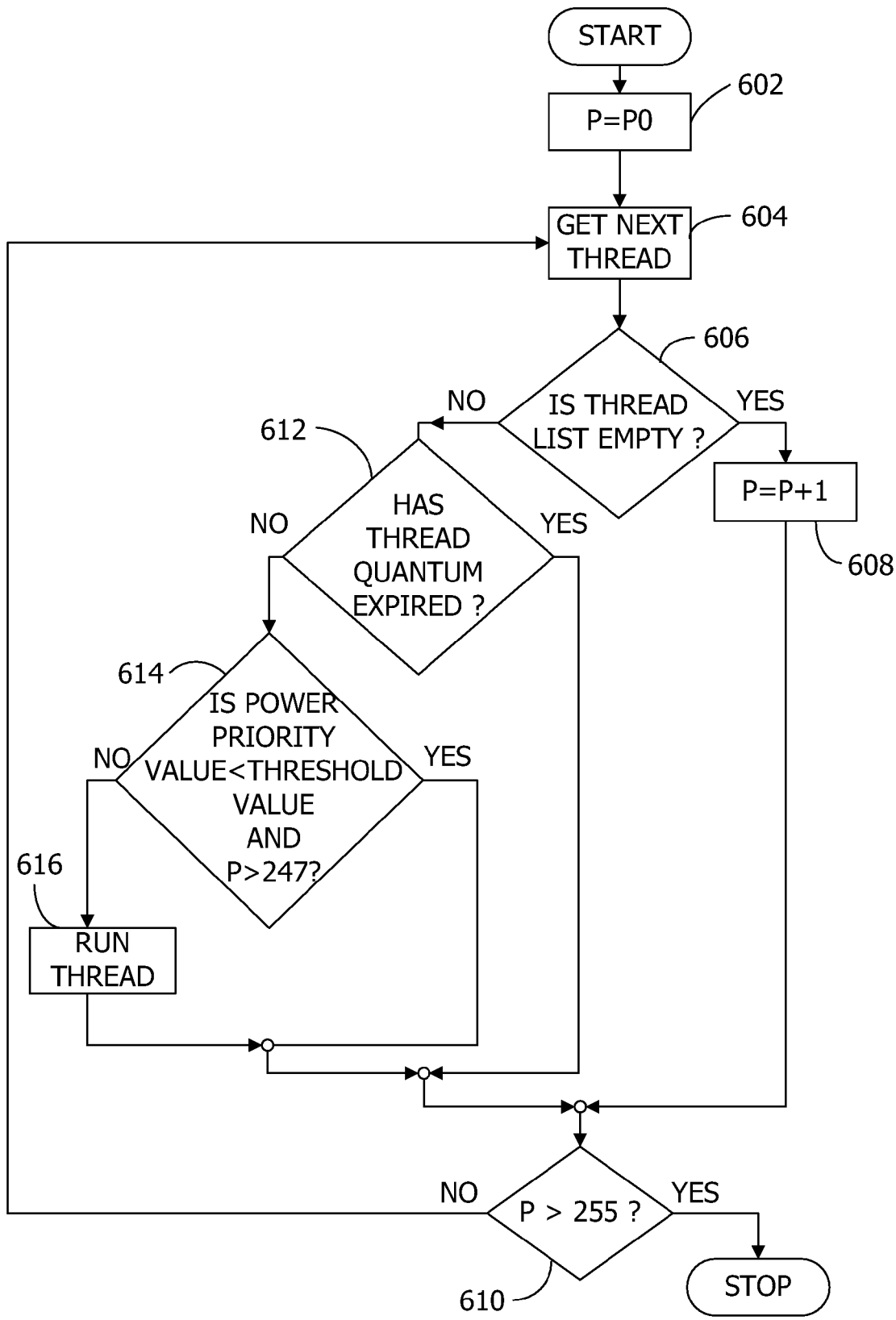
FIG. 6 is an exemplary flow chart illustrating operation of the scheduler with particular power priority values.

Referring next to FIG. 6, an exemplary flow chart illustrates operation of the scheduler with particular power priority values 112. The power state value for the computing device 102 is set to zero at 602. The next thread is selected at 604. If a thread list is empty at 606 (e.g., no threads to execute), the power state value is increased at 608. If the power state value exceeds 255 at 610, the scheduler stops. If the power state value does not exceed 255 at 610, the next thread is selected at 604.

If the thread list is not empty at 606 (e.g., there are threads to execute) and if the thread quantum has not expired at 612, the power priority value 112 is compared to the power state value at 614. The quantum is a unit of scheduling time for which a thread is given control over the processor 106. If the power priority value 112 does not violate the power state value at 614, the thread is executed at 616. If the thread quantum has expired at 612 or if the power priority value 112 exceeds the power state value at 614, the scheduler continues at 610.

Figure 7:
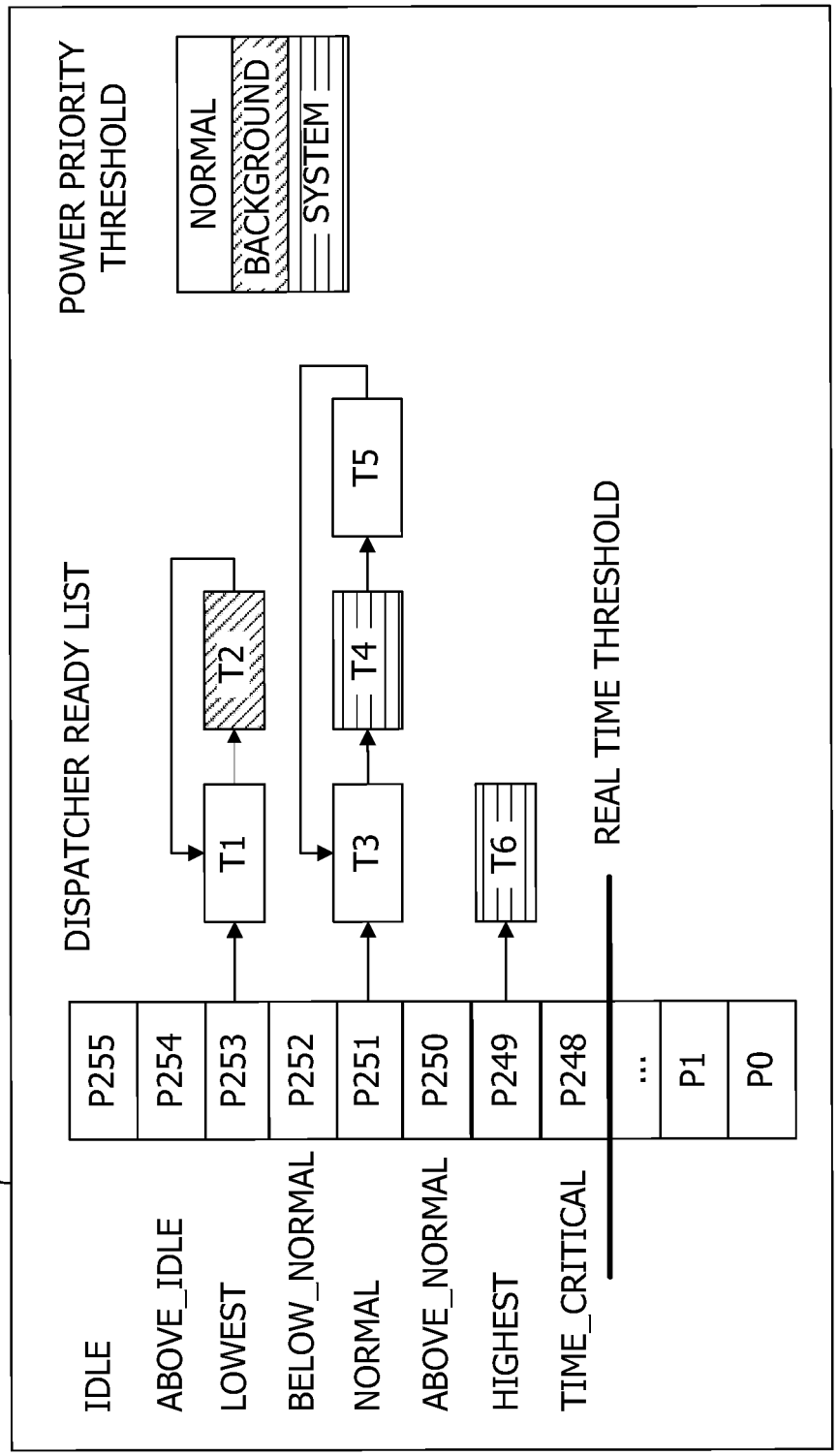
FIG. 7 is an exemplary block diagram illustrating the scheduling of threads based on a threshold value associated with a power state of a computing device.

Referring next to FIG. 7, an exemplary block diagram 702 illustrates the scheduling of threads based on a threshold value associated with a power state of the mobile computing device, such as the mobile computing device 402 shown in FIG. 4. In the example of FIG. 7, three power states and corresponding threshold values are defined as shown in Table 1 below for the mobile computing device 402. The priority levels range from zero (highest priority) to 255 (lowest priority). Priorities below 248 are considered real time priorities and are not available to normal applications, in an embodiment. In the example of FIG. 7, power priority filtering is used only for non-real-time threads.

TABLE 1

Exemplary Power States and Corresponding Threshold Values.

| Power State | Threshold Value |
|---|---|
| ON | NORMAL = 255 |
| BACKLIGHT OFF | BACKGROUND = 100 |
| SYSTEM IDLE | SYSTEM = 99 |

In the example of FIG. 7, six non-real-time threads belong to the Home Screen, Telephone Application, Synchronization Application, Cool Game, and Anti-Malware Application. Table 2 below lists exemplary power priority values for the applications.

TABLE 2

Exemplary Power Priority Values for the Mobile Device Applications.

| Thread | Power Priority | Application |
|---|---|---|
| T1 | 240 | Cool Game |
| T2 | 99 | Anti Malware |
| T3 | 240 | Cool Game |
| T4 | 49 | Sync |
| T5 | 240 | Home |
| T6 | 49 | Phone |

As shown in FIG. 7, the Cool Game and the Home app do not use a processor in the mobile computing device 402 when the screen is off. Further, the anti malware application does not waste resources when the system is IDLE. In an embodiment, the dispatcher ready list is a weighted round-robin data structure used by a kernel to make scheduling decisions.

In one scenario, the mobile computing device 402 is in an ACTIVE power state. The scheduler manages the processor in the exemplary order shown in Table 3 below.

TABLE 3

Exemplary Thread Management when the Mobile Computing Device is ACTIVE.

| Thread | Status |
|---|---|
| T6 | runs continually until it blocks waiting for a resource |
| T3 | runs for a quantum |
| T4 | runs for a quantum |
| T5 | runs for a quantum and loops back until all the threads block or T6 wakes |
| T1 | runs in sequence for a quantum until it blocks or a higher priority thread resumes |
| T2 | runs in sequence for a quantum until it blocks or a higher priority thread resumes |

In another scenario, the mobile computing device 402 is in a BACKLIGHT OFF power state. The scheduler manages the processor in the exemplary order shown in Table 4 below.

TABLE 4

Exemplary Thread Management when the Mobile Computing Device is in a BACKLIGHT OFF State.

| Thread | Status |
|---|---|
| T6 | runs continually until it blocks waiting for a resource |
| T4 | runs until all the threads block or T6 awakes |
| T2 | runs until it blocks or a higher priority thread resumes |

In another scenario, the mobile computing device 402 is in a SYSTEM IDLE power state. The scheduler manages the processor in the exemplary order shown in Table 5 below.

TABLE 5

Exemplary Thread Management when the Mobile Computing Device is in a SYSTEM IDLE State.

| Thread | Status |
|---|---|
| T6 | runs continually until it blocks waiting for a resource |
| T4 | runs until all the threads block or T6 awakes |

Figure 8:
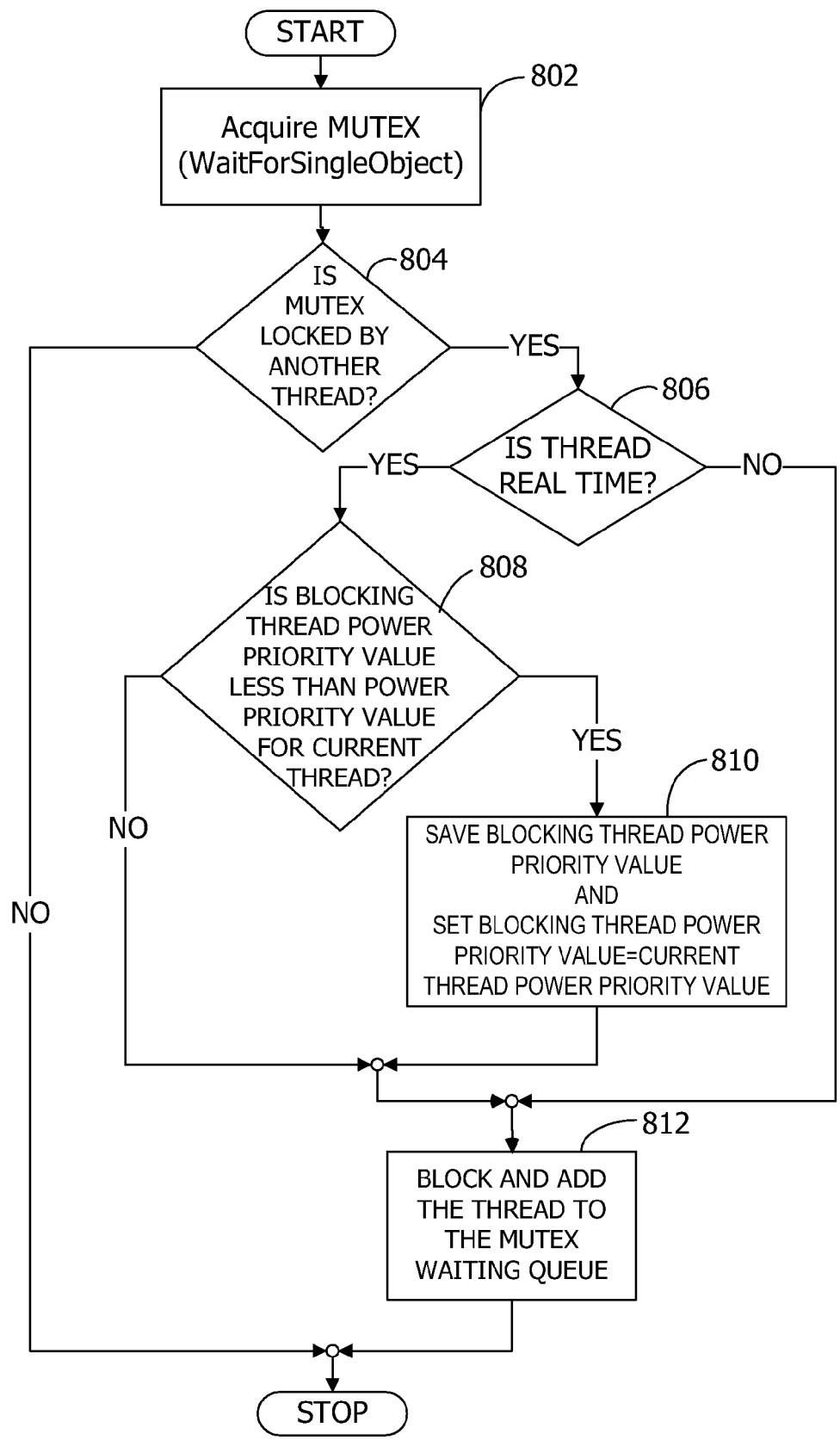
FIG. 8 is an exemplary flow chart illustrating inheritance of a power priority value to avoid thread blocking.

Referring next to FIG. 8, an exemplary flow chart illustrates inheritance of the power priority value 112 to avoid thread blocking. In this example, a lower priority thread (e.g., a blocking thread) holds a resource, and delays the execution of a higher priority thread (e.g., a current thread) when both threads are contending for the same resource.

At 802, the current thread attempts to acquire a mutual exclusion object (e.g., a MUTEX). The MUTEX is associated with the resource required by the current thread. Unlike a semaphore, the MUTEX will be owned by the current thread. Successfully acquiring the MUTEX will cause other threads or processes attempting to access the resource to block on the MUTEX. If the MUTEX is locked by the blocking thread at 804 and the current thread is real-time at 806, the scheduler determines if the power priority value 112 of the blocking thread is less than the power priority value 112 of the current thread at 808. If the power priority value 112 of the blocking thread is not less than the power priority value 112 of the current thread at 808, the current thread blocks and is added to a waiting queue for the MUTEX at 812.

If the power priority value 112 of the blocking thread is less than the power priority value 112 of the current thread at 808, the scheduler saves the power priority value 112 for the blocking thread (e.g., in a thread structure), sets the power priority value 112 for the blocking thread to be at least equal to the power priority value 112 of the current thread at 810, and then blocks the current thread at 812. The blocking thread executes until the resource is released.

If the computing device 102 transitions to a new power state having a lower power priority value 112 (e.g., less permissive), one or both of the blocking thread and the current thread may block. For example, if the new power state of the computing device 102 permits or allows execution of threads with the power priority value 112 of the current thread, the blocking thread executes until the resource is released. If the new power state of the computing device 102 does not permit or allow execution of threads with the power priority value 112 of the current thread, both the current thread and the blocking thread block or are filtered out until the power state of the computing device 102 transitions to a more permissive state. Alternatively or in addition, the power priority value 112 of the blocking thread may be increased again to enable the blocking thread to execute in the new power state to allow the resource to be released.

In an example, the power priority value 112 is adjusted by updating a database via an application programming interface (API). In an embodiment, the power priority value 112 for the blocking thread is set to the maximum power priority value 112 among the threads waiting for the resource. Additionally, a flag, bit, or other indicator is created to reflect that the power priority value 112 of the blocking thread was adjusted, and the original power priority value is stored or otherwise preserved for eventual restoration in a data structure (see FIG. 9). Element 810 reflects inheritance, priority borrowing, priority inversion, or other adjustment of the power priority value 112 to enable the resource to be eventually released.

In general, if a first thread blocks a resource but has a power priority value 112 less than the threshold value for a newly detected power state of the computing device 102 and a second thread requires the resource and has a power priority value 112 greater than the threshold value, the power priority value 112 of the second thread is assigned to the first thread to enable the first thread to execute to release the resource. Release of the MUTEX is next described in FIG. 9.

Figure 9:
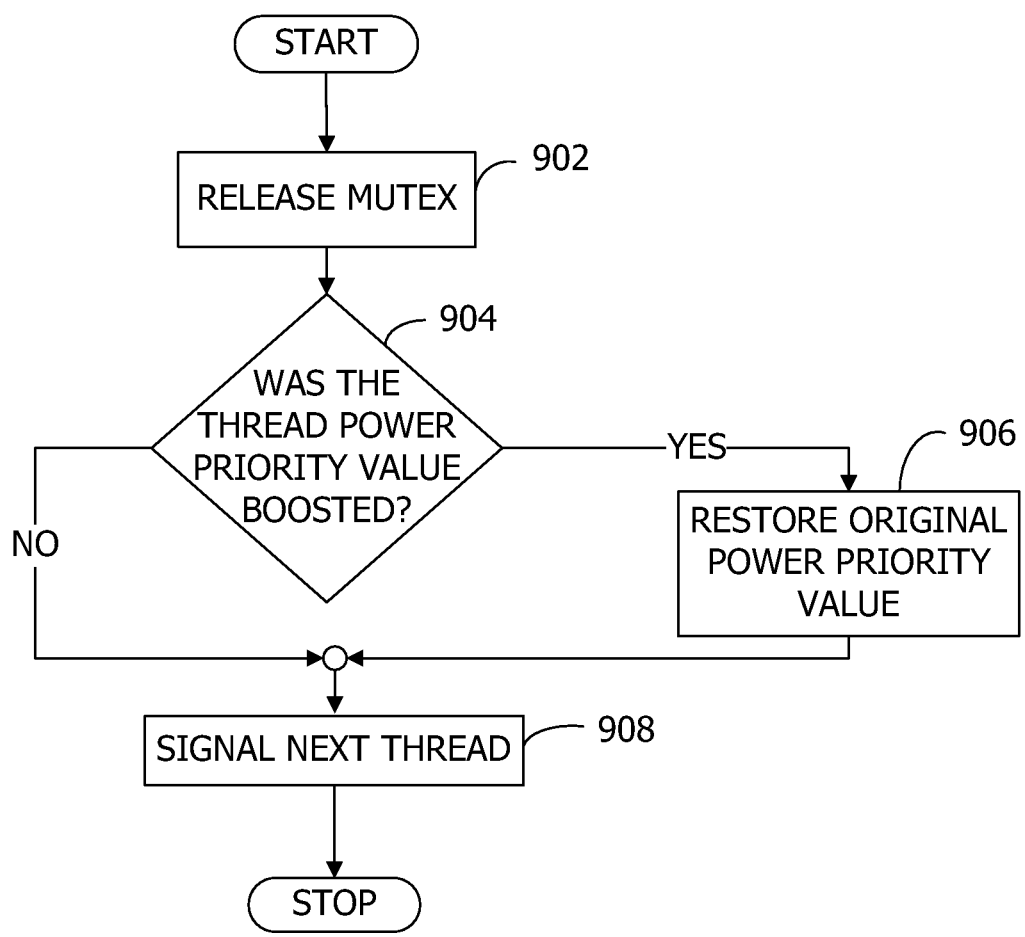
FIG. 9 is an exemplary flow chart illustrating restoration of an inherited power priority value after thread completion.

Referring next to FIG. 9, an exemplary flow chart illustrates restoration of an inherited power priority value after thread completion and release of a resource. At 902, the blocking thread from FIG. 8 releases the MUTEX. At 904, the scheduler determines whether the power priority value 112 of the blocking thread was inherited from another thread, boosted, or otherwise adjusted. For example, the scheduler accesses a data structure used to indicate whether the power priority value 112 had been adjusted (e.g., as described in FIG. 8). If so, the original power priority value is restored from the data structure or other data structure (e.g., a thread data structure) at 906. A next thread in the MUTEX waiting queue is signaled at 908 that the resource is available for use by the next thread.

Figure 10:
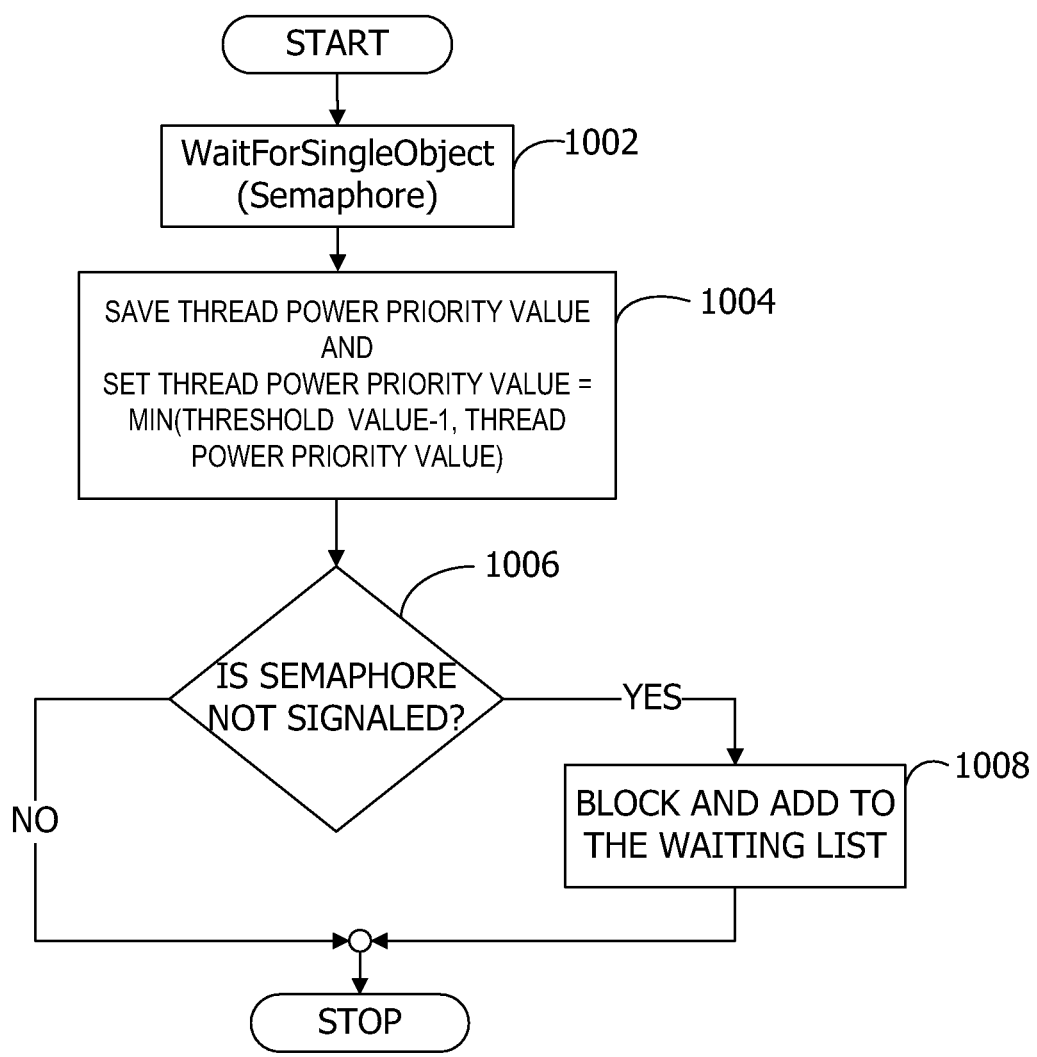
FIG. 10 is an exemplary flow chart illustrating adjustment of a power priority value for a thread contending for a semaphore.

Referring next to FIG. 10, an exemplary flow chart illustrates adjustment of the power priority value 112 for a thread contending for a semaphore. In an embodiment, the semaphore is not owned by a thread. At 1002, a WaitForSingleObject function is called for the semaphore. This function returns when the semaphore has been signaled. When the semaphore is available, the power priority value 112 of the blocking thread inherits the threshold value to ensure that the blocking thread will run. For example, at 1004, the power priority value 112 of the blocking thread is saved, and then set to be the lesser of the power priority value 112 of the blocking thread and the threshold value minus one. Additionally, a flag, bit, or other indicator is created to reflect that the power priority value 112 of the blocking thread was adjusted, and the original power priority value is stored or otherwise preserved for eventual restoration in a data structure (see FIG. 11). The current thread then contends for the semaphore. If the semaphore has not signaled at 1006, the current thread blocks and is added to a waiting list for the semaphore at 1008. Release of the semaphore is next described in FIG. 11.

Figure 11:
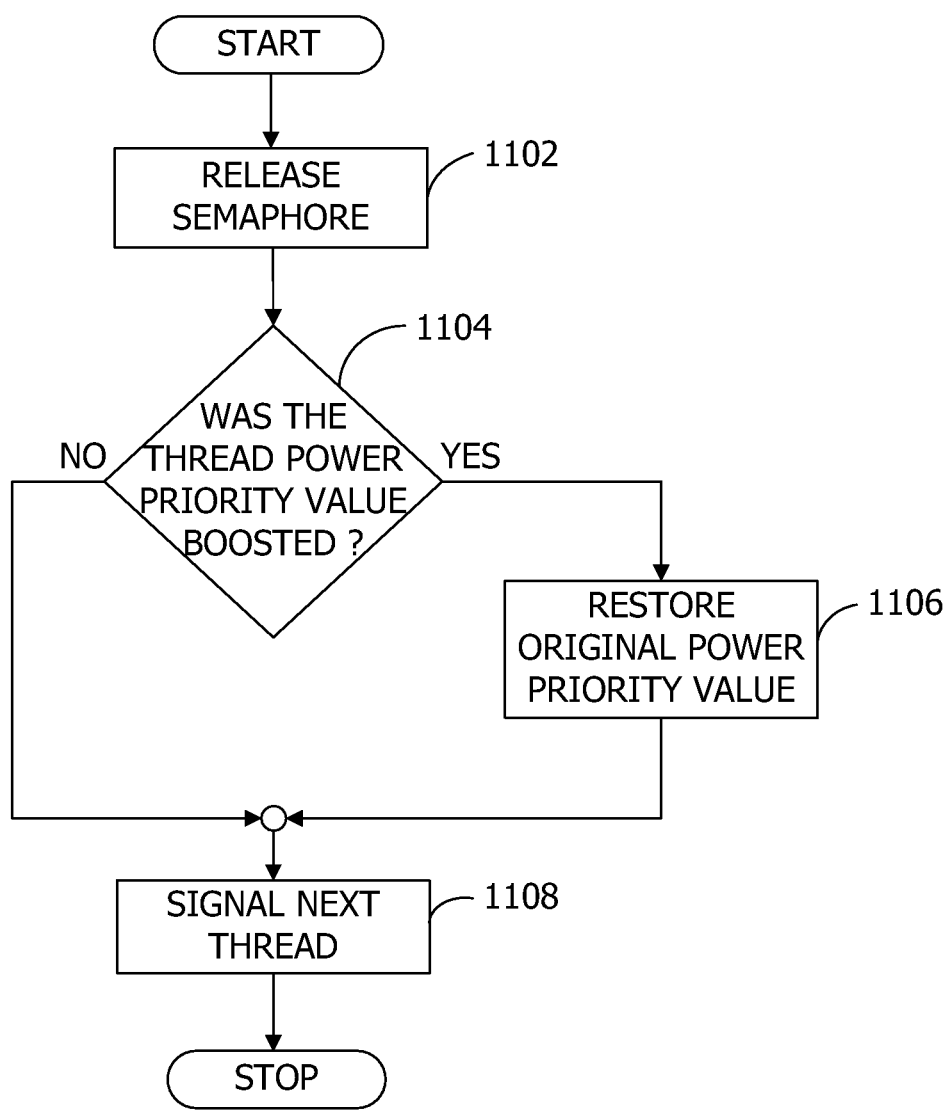
FIG. 11 is an exemplary flow chart illustrating release of a semaphore and restoration of a power priority value.

Referring next to FIG. 11, an exemplary flow chart illustrates release of the semaphore and restoration of the power priority value 112. At 1102, the semaphore is released by the blocking thread. At 1104, the scheduler determines whether the power priority value 112 of the blocking thread was inherited from another thread, boosted, or otherwise adjusted. For example, the scheduler accesses a data structure used to indicate whether the power priority value 112 had been adjusted (e.g., as described in FIG. 10). If so, the original power priority value is restored at 1106. A next thread in the waiting queue is signaled at 1108 that the semaphore is available for use by the next thread (e.g., the current thread from FIG. 10).

Exemplary Operating Environment

A computer or the computing device 102 such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for maintaining the list of active threads 108 and the list of suspended threads 110 as a function of the power priority value 112 and the threshold value, and exemplary means for managing execution of the threads based on the power state of the computing device 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system comprising:
a memory area for storing a list of active threads being executed by a mobile computing device and a list of suspended threads, said memory area further storing a power priority value for each of the active threads and the suspended threads, said memory area storing a default power priority value for each of the active threads and suspended threads if a power profile does not exist, wherein the default power priority value prevents the threads from running in any power state other than an active power state, wherein the power state comprises at least one of the following: ON, IDLE, ACTIVE, STANDBY, RECHARGING, BATTERY POWER LEVEL, or BACKLIGHT OFF; and
a processor programmed to:
determine a power state of the mobile computing device upon detection of a change in the power state, the determined power state representing one of a plurality of power states each mapped to one of a plurality of threshold values;
identify one of the plurality of threshold values corresponding to the determined power state;
compare the identified threshold value to the power priority value for each of the active threads and suspended threads individually; and
alter the list of active threads and the list of suspended threads by moving at least one thread between the list of active threads and the list of suspended threads based on the comparison to manage the power state of the mobile computing device.

2. The system of claim 1, wherein the memory area further stores an active queue for storing the list of active threads and a suspended queue for storing the list of suspended threads.

3. The system of claim 1, wherein a first thread in the list of active threads has a power priority value less than the identified threshold value, wherein a second thread in the list of active threads has a power priority value greater than the identified threshold value, wherein the second thread requires a resource blocked by the first thread, and further comprising assigning a power priority value of the second thread to the first thread to enable the first thread to execute to release the resource.

4. The system of claim 1, wherein the processor is further programmed to identify, from the list of active threads, one or more threads each having the power priority value less than the identified threshold value, and wherein the processor alters the list of active threads and the list of suspended threads by moving the identified one or more threads from the list of active threads to the list of suspended threads.

5. The system of claim 1, wherein the processor is further programmed to identify, from the list of suspended threads, one or more threads each having the power priority value greater than or equal to the identified threshold value, and wherein the processor alters the list of active threads and the list of suspended threads by moving the identified one or more threads from the list of suspended threads to the list of active threads.

6. The system of claim 1, further comprising means for maintaining the list of active threads and the list of suspended threads as a function of the power priority value and the threshold value.

7. The system of claim 1, further comprising means for managing execution of the threads based on the power state of the mobile computing device.

8. The system of claim 1, wherein the processor is further programmed to alter the list of active threads and the list of suspended threads as a part of an operating system scheduler.

9. The system of claim 1, wherein the processor is further programmed to alter the list of active threads and the list of suspended threads as a part of a power priority monitoring service.

10. A method for managing threads for execution based on a power state of a computing device, said method comprising:
    identifying a plurality of threads for execution on a computing device, wherein a default power priority value is associated with each of the identified threads if a power profile does not exist, wherein the default power priority value prevents the identified threads from running in any power state other than an active power state, wherein the power state comprises at least one of the following: ON, IDLE, ACTIVE, STANDBY, RECHARGING, BATTERY POWER LEVEL, or BACKLIGHT OFF;
    determining a power priority value for each of the identified threads, the power priority value being distinct from a process priority value;
    determining a threshold value for the computing device, said threshold value being one of a plurality of threshold values each corresponding to one of a plurality of power states of the computing device;
    comparing the determined threshold value to the determined power priority value for each of the identified threads individually;
    selecting one or more of the plurality of threads based on said comparing; and
    executing the selected one or more threads.

11. The method of claim 10, wherein one or more of the plurality of threads are associated with an application program, and further comprising:
    accessing the power profile for the application program, said power profile defining a power priority value for each of the one or more threads; and
    assigning the power priority value to each of the one or more threads based on the accessed power profile.

12. The method of claim 10, further comprising: defining a plurality of power states of the computing device; and defining the threshold value for each of the defined plurality of power states.

13. The method of claim 10, further comprising filtering the threads based on the power priority value for each of the threads.

14. The method of claim 10, wherein the determined threshold value corresponds to a battery power level for the computing device.

15. The method of claim 10, wherein selecting the one or more of the plurality of threads comprises selecting one or more of the plurality of threads having a determined power priority value greater than or equal to the determined threshold value.

16. The method of claim 10, further comprising suspending one or more of the threads having a determined power priority value less than the determined threshold value.

17. One or more computer storage media having computer-executable components, said components comprising:
    a detection component for receiving a request for execution of a thread, for assigning a default power priority value to the thread if a power profile does not exist, and for determining a power priority value associated with the thread if the power profile exists, wherein the default power priority value prevents the thread from running in any power state other than an active power state, wherein the power state comprises at least one of the following: ON, IDLE, ACTIVE, STANDBY, RECHARGING, BATTERY POWER LEVEL, or BACKLIGHT OFF, the power priority value being distinct from a process priority value;
    a state component for determining a threshold value for a computing device, said threshold value being one of a plurality of threshold values each corresponding to one of a plurality of power states of the computing device;
    a priority component for comparing the power priority value associated with the thread and determined by the detection component with the threshold value determined by the state component; and
    a dispatcher component for scheduling the thread for execution if the power priority value determined by the detection component violates the threshold value determined by the state component, and for suspending execution of the thread if otherwise.

18. The computer storage media of claim 17, wherein the dispatcher component schedules the thread for execution if the power priority value exceeds the threshold value.

19. The computer storage media of claim 17, wherein the computing device has at least one processor associated therewith, and wherein the power state corresponds to a power state associated with the processor.

20. The computer storage media of claim 17, further comprising an inheritance component for increasing the power priority value of the thread above the threshold value if the thread is blocking a resource required by another thread being executed.

* * * * *